US008418346B2

(12) United States Patent
Chen

(10) Patent No.: US 8,418,346 B2
(45) Date of Patent: Apr. 16, 2013

(54) WIRE TERMINATION TOOL AND RJ JACK FOR USE THEREWITH

(75) Inventor: Chou-Hsing Chen, Keelung (TW)

(73) Assignee: Surtec Industries Inc., Keelung (TW)

( * ) Notice: Subject to any disclaimer, the term of this patent is extended or adjusted under 35 U.S.C. 154(b) by 1191 days.

(21) Appl. No.: 12/211,280

(22) Filed: Sep. 16, 2008

(65) Prior Publication Data

US 2010/0064502 A1 Mar. 18, 2010

(51) Int. Cl.
*B23P 23/00* (2006.01)
*H01R 43/042* (2006.01)

(52) U.S. Cl.
USPC ................. 29/566.4; 29/750; 7/107; 439/676

(58) Field of Classification Search ................. 29/566.4, 29/33 M, 750–752, 758; 7/107; 72/409.06, 72/409.14, 409.16; 439/676
See application file for complete search history.

(56) References Cited

U.S. PATENT DOCUMENTS 4,241,496 A 12/1980 Gregson
4,567,639 A 2/1986 Fasano
4,696,090 A 9/1987 Gregson et al.
5,195,230 A 3/1993 Krietzman
5,832,603 A 11/1998 Fallandy
6,161,416 A 12/2000 Wilhelm et al.
6,230,387 B1 * 5/2001 Gritters et al. ............... 29/566.4
6,519,831 B2 * 2/2003 Futamura et al. ............ 29/564.7
6,807,728 B2 10/2004 Griffin et al.
2005/0251991 A1 11/2005 Alexander et al.

FOREIGN PATENT DOCUMENTS

EP 0375489 A1 6/1990
EP 2 166 625 A2 3/2010

OTHER PUBLICATIONS

"Research and development of parallel clamping tool", Jenq-Huey Shyu et al., FIGS 13 and 16, Thesis No. C01024.NSC-92-2622-E-027-029-CC3i of the 8$^{th}$ national mechanism and machinery design academic seminar thesis collection, dated Dec. 2, 2005.

* cited by examiner

*Primary Examiner* — Erica E Cadugan
(74) *Attorney, Agent, or Firm* — McGlew and Tuttle, P.C.

(57) ABSTRACT

A wire termination and cutting tool, RJ jack and RJ jack and tool termination system is provided with the tool having a cutting module support portion and an RJ jack support portion connected to the cutting module support portion for relative movement with respect to a pivot point. An RJ jack is connected to the RJ jack support portion. The RJ jack includes wire termination locations each with an insulation displacement contact (IDC) with a cutting/clamping slot. A cutting module is connected to the cutting module support portion. The cutting module includes cutting blades for cutting wires and wire insertion parts. An actuator applies force for in curved relative movement of the cutting module support portion with respect to the RJ jack support portion. The cutting module support portion is aligned with the RJ jack at an end of the curved relative movement whereby the wire insertion parts are aligned with slots of corresponding insulation displacement contacts of the RJ jack.

18 Claims, 22 Drawing Sheets

WIRE TERMINATION TOOL AND RJ JACK FOR USE THEREWITH

FIELD OF THE INVENTION

The present invention relates in general to termination tools of the type employed for computer networks as well as for the telephone industry and particularly tools for seating and cutting the free end of wires inserted in wire terminal receptacles connected to RJ type jacks. The present invention is particularly directed to a new and improved wire termination and cutting tool, which is configured to retain a wire termination receptacle in alignment with a wire-insertion/cutting head that is translated by a trigger mechanism, so as to bring the seating/cutting head into engagement with the wire termination receptacle, and thereby accurately seat and cut one or more wires that have been inserted into the respective wire termination receptacles.

BACKGROUND OF THE INVENTION

Various tools have been used in the computer network and telephone industries for wire termination, and for cutting and seating individual network/telephone wires in network/telephone wire receptacles. Impact tools are often used with relatively stable and robust wire receptacles. Impact tools have been employed such as disclosed in U.S. Pat. Nos. 5,195,230, 4,696,090, 4,567,639, and 4,241,496 and the patents cited therein. In other situations, tools are employed that hold and support the wire receptacle for wire termination and cutting.

RJ-45 type terminal jacks present an example in which the wire termination receptacle is not affixed to a relatively stable structure. This is also the case with such jacks that are connected as modules into a patch panel frame to form a patch panel. A pliers-type of compression tool (such as an Anixter Part No. 139587) is known that requires careful independent handling of a number of parts, in order to properly align the blades of the insertion and cutting head with the wire seating slots of the jack. The tines of a respective wire-insertion blade that are retained in a wire-insertion block must be carefully aligned and inserted into a wire-seating slot in the terminal receptacle, so that when the pliers type compression tool is operated, they may engage a wire that has been placed in the slot, push the wire down and firmly seat the wire against the slot's bottom surface. As the wire becomes seated in the slot, as a result of the tool's compression movement of the wire-insertion blade into the slot, the blade's knife, which is retained in a knife support block, will have travelled alongside a side edge portion of the terminal receptacle and will cut the wire with a guillotine type of shearing/cutting action at that point. This can require an experienced craftsperson to make sure that the cutting head is precisely aligned with the wire installation receptacle.

U.S. Pat. No. 5,832,603 discloses a termination tool to seat and cut one or more wires. The tool includes a pistol handle with a trigger which brings an actuator into engagement with a wire insertion and cutting at carrier. The cutting head carrier has a insertion and cutting head with a plurality of wire insertion and cutting blades. The cutting head is linearly translatable along an axis of the handle towards a nose end of the tool. The disclosed embodiments provide a transmission of motion from the trigger to the linearly guided cutting head which is somewhat complicated and is not always smooth in operation. Further, the positioning of the RJ wire receptacle at the nose end requires some skill.

SUMMARY OF THE INVENTION

It is an object of the invention to provide a wire termination tool that allows for accurate, smooth and easy movement of a cutting module relative to an RJ jack for seating and cutting of wires to efficiently, and to easily terminate wires to wire terminals such as insulation displacement contacts (IDCs) of an RJ type jack.

It is a further object of the invention to provide a simple and dependable wire termination tool in which the cutting/seating head is a cutting module that can be simply and easily replaced, for example with a screwdriver or other simple tool.

It is another object of the invention is to provide a simple and dependable wire termination tool in which the cutting module includes wire insertion parts which are spring mounted such that cutting blades cut the wires after the wires are seated into position within the insulation displacement contacts (IDCs) of the RJ jack.

It is another object of the invention to provide a simple and dependable wire termination tool with an RJ support portion that allows an RJ jack to be seated in either of two directions (positions) for seating (terminating) and cutting wires. The arrangement for connecting the RJ jack on the wire termination tool preferably includes structure for fixing the RJ jack in either of the two directions.

According to the invention a wire termination and cutting tool is provided comprising a cutting module support portion and an RJ jack support portion connected to the cutting module support portion for relative movement with respect to a pivot point. An actuator is provided for applying force to move the cutting module support portion with respect to the RJ jack support portion in curved relative movement.

The curved movement is especially advantageous based on each support portion including guide parts with a pivot connection. An RJ jack is advantageously connected to the RJ jack support portion. The RJ jack includes a plurality of wire termination locations each with an insulation displacement contact with a cutting/clamping slot. A cutting module is advantageously removably connected to the cutting module support portion, the cutting module including cutting blades for cutting wires and wire insertion parts, the cutting module support portion being aligned with the RJ jack at an end of the curved relative movement such that the wire insertion parts are aligned with cutting/clamping slots of corresponding insulation displacement contacts of the RJ jack.

Each of the cutting/clamping slots may is advantageously provide an aligned position and a final seated (terminated) position. The cutting module may is advantageously comprise a spring arrangement with the wire insertion parts being spring mounted in the cutting module whereby the wire insertion parts press wires from the aligned position into the seated position in the RJ jack termination locations prior to the cutting blades cutting the wires.

A latch connection means is advantageously provided for latching the cutting module to the cutting module support portion and for unlatching the cutting module from the cutting module support portion for removal of the cutting module from the cutting module support portion. The latch connection means may advantageously comprise a latching surface of the jack support portion and a latching element connected to the cutting module, the latching element engaging the latching surface for latching the cutting module to the cutting module support portion, the latching element being movable relative to the latching surface for removal of the cutting module from the cutting module support portion. The latch connection means may also include a guide rail associated with one of the cutting module and the cutting module support portion and a guide groove associated with the other of the cutting module and the cutting module support portion. The guide rail may be guided in the guide groove to position the latching element for engagement with the latching surface.

The cutting module support portion may include an access opening. The latching element, in a state engaging the latch surface, is accessible through the access opening whereby a screwdriver can move the latching element relative to the latching surface for removing the cutting module from the cutting module support portion.

The RJ support portion may advantageously include a detent connection means or latching structure cooperating with the RJ jack for holding the RJ jack in a position relative to the RJ support portion.

The RJ jack may is connected to the RJ jack support portion. The RJ jack includes a plurality of wire termination locations each with an insulation displacement contact with a cutting/clamping slot. The RJ jack also may advantageously include detent connection means or a counter latch part. The means may also include a guide feature such as a rail on the RJ support portion for engaging a receiving groove of the RJ jack. The RJ support portion may define a receiving region with retaining edge to form a receiving groove with a body portion of the RJ jack forming a rail for movement along the receiving groove and into a final position in the receiving region. The interacting tool and RJ jack structure provides a guiding of the RJ jack into a predetermined position relative to the RJ support portion. The fixing means fixes the jack in position. Either of the two orientations of the jack is preferably provided with the same guiding structure (on the jack and the jack support portion) and with the same fixing structure. The fixing structure that is particularly advantageous includes a spring and ball mounted in the RJ jack support portion with the spring biased toward a spring ball opening in a surface of the RJ support portion and a detent in the RJ jack wherein the spring ball engages the detent to hold the RJ jack in a predetermined position along the guide feature.

The receiving groove and guide may have a dove tail or T cross section. The RJ jack may have a widened entrance region at each of two sides of the RJ jack to allow easy mounting on the guide rail. According to another embodiment the body portion of a 180° RJ jack (wherein the RJ jack opening has a plug in direction that is 180° with respect to a direction of wire insertion in IDCs for wire termination) has a stop edge and a latch (for example used to retain the jack in a faceplate or patch panel support) that form the guide rail to be guided into the receiving portion of the jack support portion that forms a guide groove.

The actuator of the tool is advantageously a lever acting on the cutting module support portion to move the cutting module support portion relative to the jack support portion along the defined arcuate guide path.

According to another aspect of the invention, a wire termination and cutting tool is provided comprising a cutting module support portion, an RJ jack support portion connected to the cutting module support portion for relative movement along a defined path, an actuator applying force to move the cutting module support portion with respect to the RJ jack support portion, a cutting module and a latch connection means for latching the cutting module to the cutting module support portion and for unlatching the cutting module from the cutting module support portion for removal of the cutting module from the cutting module support portion.

According to another aspect of the invention a wire termination and cutting tool system is provided comprising a cutting module support portion and an RJ jack support portion connected to the cutting module support portion for relative movement. The RJ jack support portion includes an RJ jack receiving surface with a guide rail along a predetermined path. A hand actuator cooperating with the support portions is provided for applying force to move the cutting module support portion with respect to the RJ jack support portion. An RJ jack with a receiving groove is connectable to the tool and forms part of a tool system.

The tool system may include RJ jack fixing means for holding the position of the RJ jack in either of two orientations on the tool for termination of wires in the IDCs of the jack. The fixing means may be a detent connection means for holding a position of the RJ jack relative to the RJ support portion. The detent connection means may comprise a spring and ball biased toward a spring ball opening in the surface of the RJ support portion and a detent in the RJ jack. The spring ball engages the detent to hold the RJ jack along the guide rail.

The system includes a cutting module that is a separate component and connects with the tool. The cutting module connects to the cutting module support portion. The cutting module includes cutting blades for cutting wires and wire insertion parts. The cutting module support portion is aligned with the RJ jack at an end of the predetermined path of movement such that the wire insertion parts are aligned with cutting/clamping slots of corresponding insulation displacement contacts of the RJ jack.

The tool has a cutting module that advantageously may be connectable to and disconnectable from a cutting module support portion of the tool. The tool may advantageously be formed to move an RJ jack support portion with positioned RJ jack relative to the cutting module support portion for curved relative movement with respect to a pivot point.

According to a further aspect of the invention, an RJ jack is provided that includes a cooperating guide means for cooperation with a wire termination tool support cooperating guide means for guiding the RJ jack into one of two different positions for termination of wires in IDCs of the RJ jack. The RJ jack also includes cooperating holding means cooperation with a wire termination tool support cooperating holding means for holding the RJ jack in each of the two different positions for termination of wires.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
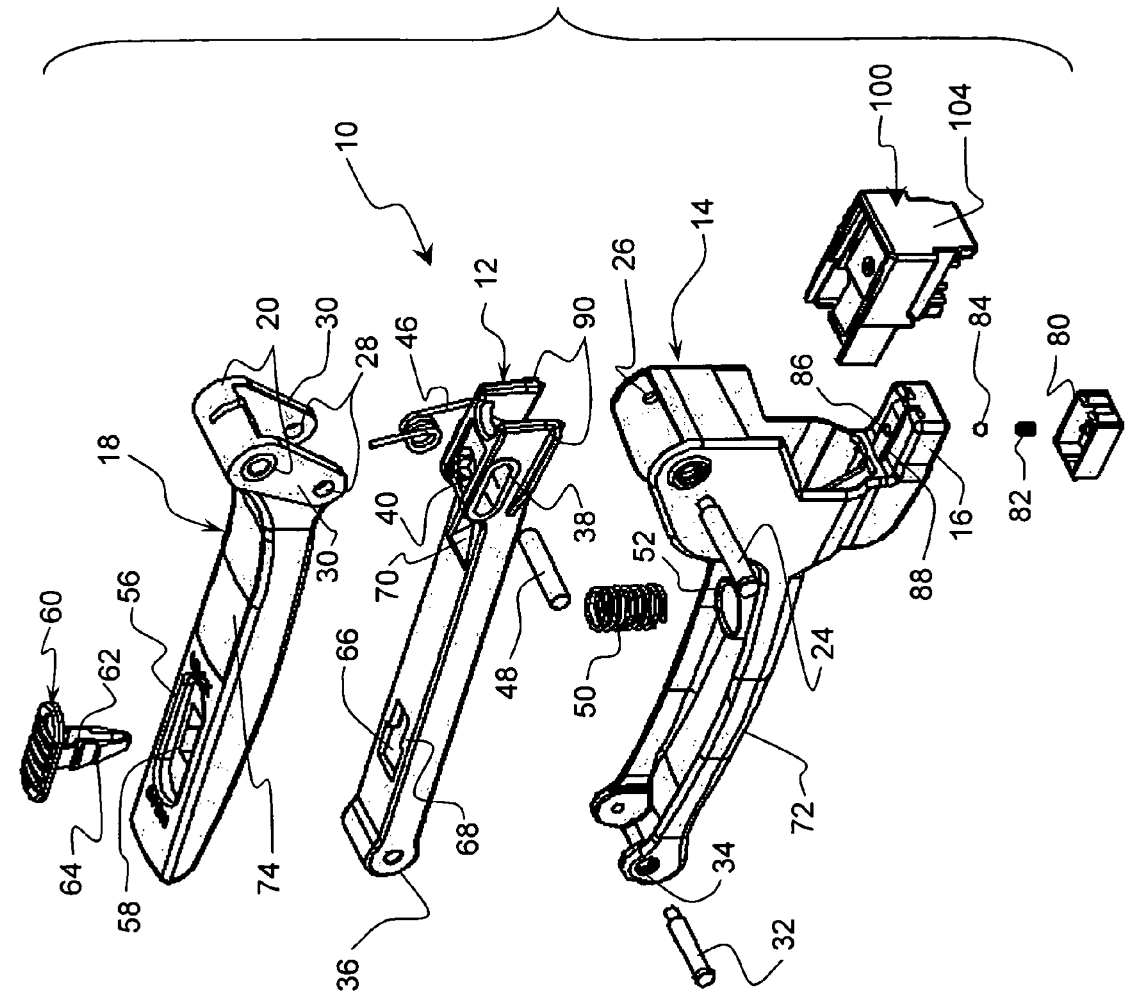
FIG. 1 is an exploded perspective view showing a wire termination tool according to the invention.
Figure 4:
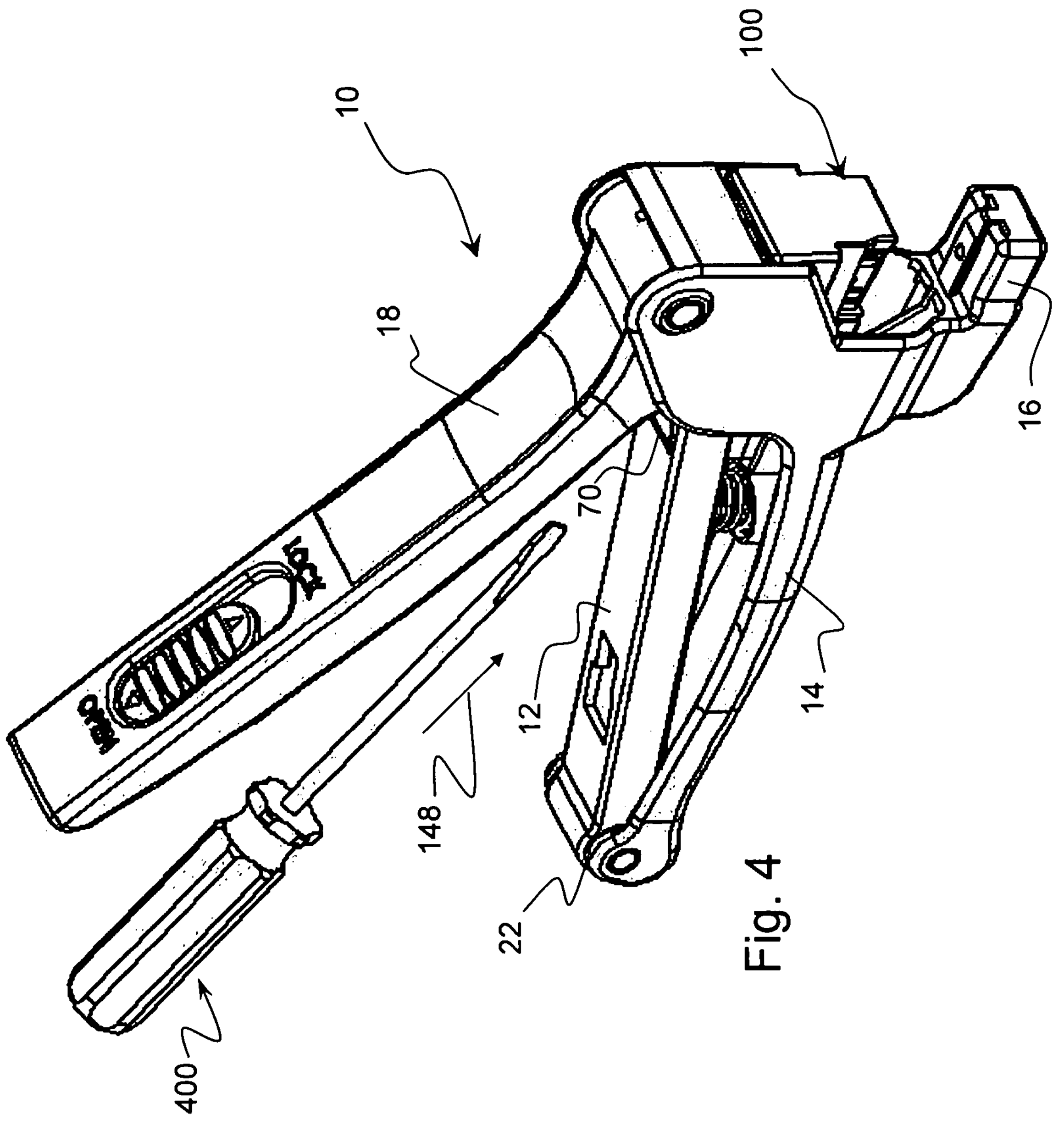
FIG. 4 is a perspective view of the wire termination tool showing insertion of a screwdriver for removal of the cutting module.

Referring to the drawings in particular, FIG. 1 shows a wire termination tool 10 according to the invention in a perspective exploded view. The wire termination tool has a first guide part in the form of handle upper pivot part 12 and a second guide part in the form of a handle lower pivot part 14. The handle upper pivot part 12 and a handle lower pivot part 14 are connected at a pivot point 22 (FIG. 4). The handle upper pivot part 12 defines a cutting module support portion of the wire termination tool 10 that supports a cutting module 100. The handle lower pivot part has a jack support portion 16. A handle lever part 18 (also referred to as actuating part 18) is provided as a lever actuator for applying force to move the handle guide part 12, with the cutting module 100, with respect to the RJ jack support portion 16 along a predefined curved path, based on the pivot point 22. Instead of a lever action for the actuating part 18, a cam arrangement can also be provided for applying the force to move the guide parts 12 and 14 along the curved path. However, the lever actuator part is particularly advantageous.

The handle lever part 18 has a pin through opening 20 and the handle lower pivot part 14 has a lever connection opening 26 that receives a lever pivot pin 24. The handle lever part 18 is connected to the handle lower pivot part 14 by the pin 24 such that handle lever part 18 pivots relative to handle lower pivot part 14. The handle lower pivot part 14 has a pivot point opening 34 and the handle upper pivot part 12 has a pivot point opening 36. The openings 34 and 36 receive a pivot pin 32 to allow a pivoting movement of the handle 12, with cutting module 100, with respect to the RJ jack support portion 16.

The handle lever part 18 has side flanges 30 each with a pin opening 28. The handle upper pivot part 12 has a cam slot 38. A cam pin 48 passes through pin openings 28 and is supported by the flanges 30 so that it can ride along cam slot 38. The kinematics of movement of the handle lever part 18 relative to the handle lower pivot part 14 is dictated by the pivot connection via pivot pin 24. The handle lever part 18 is connected to the handle upper pivot part 12 via cam slot 38 and cam pin 48, to provide the lever actuator function by which force is applied to move the handle upper pivot part 12 relative to the handle lower pivot part 14 so as to move the cutting module 100 with respect to the RJ jack support portion 16. With the pivot point 22, the movement of the cutting module 100 with respect to the RJ jack support portion 16 is limited to curved relative movement. This provides a very smooth operation during wire termination (as discussed further below). Although the force transmission linkage and pivoting linkage of the handle lever part 18 is relatively smooth, spring biasing/damping with a spring 46 avoids any lose movement or chattering. A spring support surface 42 is advantageously provided at an upper surface 40 of the handle upper pivot part 12 and a spring support surface 44 is provided at a lower surface of the handle lever part 18 so as to support the spring 46 and allow a smooth application of force and smooth movements of the handle lever part 18 as clamping force is applied via lower grip surface 72 and upper gripping surface 74. Further, a spring 50 is positioned between the handle upper pivot part 12 and the handle lower pivot part 14 to bias these apart. The spring 50 is mounted in a spring seat 52 of the handle lower pivot part 14 and a similar seat 54 (see FIG. 6) in the handle upper pivot part 12.

The handle lever part 18 is provided with a latch element guideway 56 around a latch opening 58. A latching element 60 is provided with an upper gripping surface 63, a downwardly extending portion having an upper latching contour 62 and a lower latching contour 64. The latching element 60 is seated with the upper latching contour 62 engaging an edge 65 (FIG. 6) of the latch opening 58 so the latching element 60 can reciprocate between a rear position and latching forward position in the region of the latch element guideway 56 while the latch element 60 is maintained in the latch opening 58. The handle upper part 12 includes a latching opening 66 with a latching engagement edge contour 68 that is engaged by the latching element lower contour 64 in the latching forward position. This allows the wire termination tool 10 to be closed and maintained in a closed state. The handle upper pivot part 12 also has a screwdriver latch release access opening 70 which is used for releasing the cutting module 100 which can be guided along guide rail 90.

The RJ jack support portion 16 extends outwardly underneath the region of the pivot openings 26 of the handle lower pivot part 14. The RJ jack support portion 16 has a chamber with a lower opening with a bottom cover 80. The cover 80 has a spring support contour and is provided to close the chamber that receives a spring 82 and a locking ball 84. The upper surface of the support portion 16 includes a dovetail profile rail 88 with a locking ball contact region 86. The spring 82 is supported by the spring contour of the bottom cover 80. The spring 82 applies a spring force to the locking ball 84 which protrudes into the locking ball contact region 86.

Figure 2:
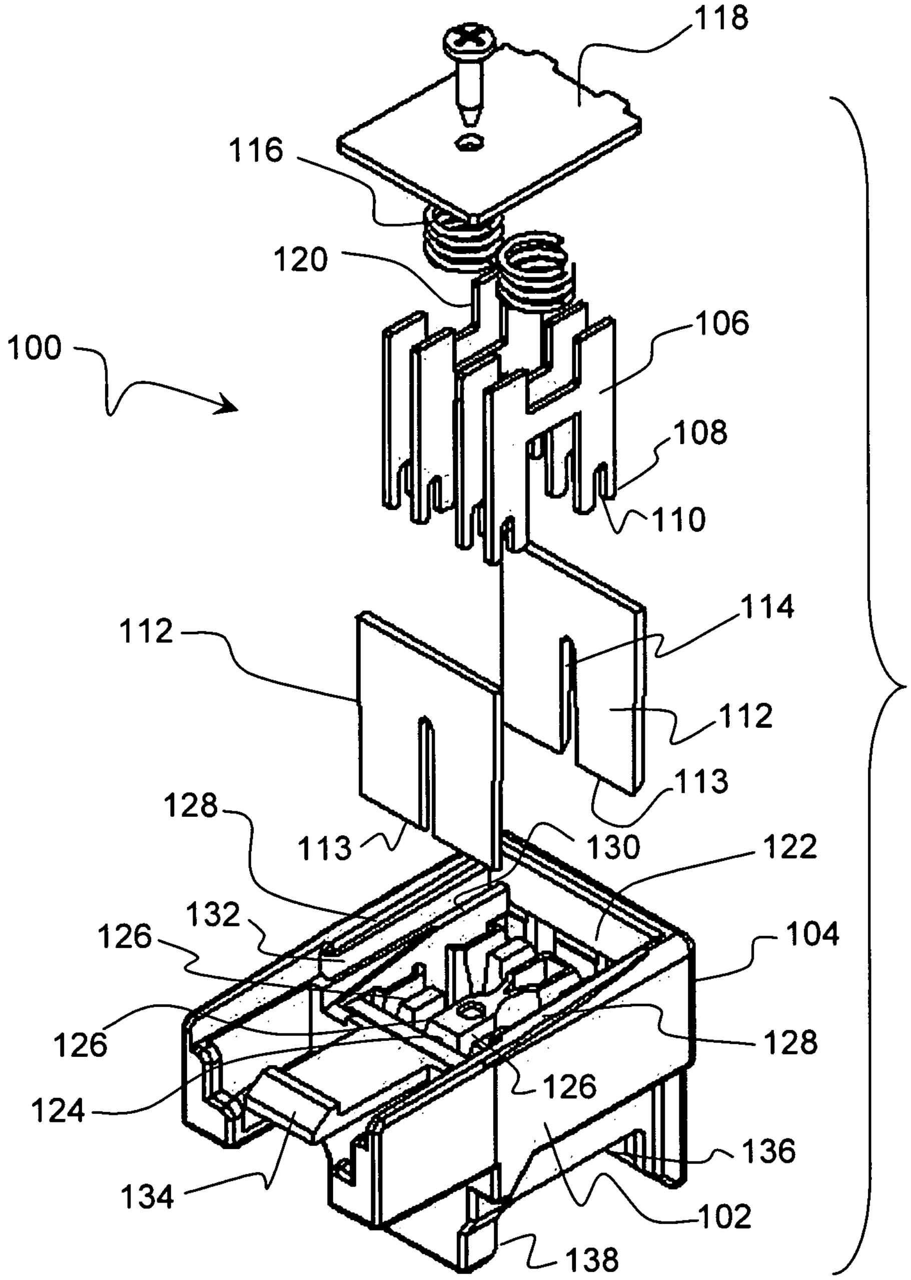
FIG. 2 is an exploded perspective view of a removable/replaceable cutting module assembly according to the invention.
Figure 3:
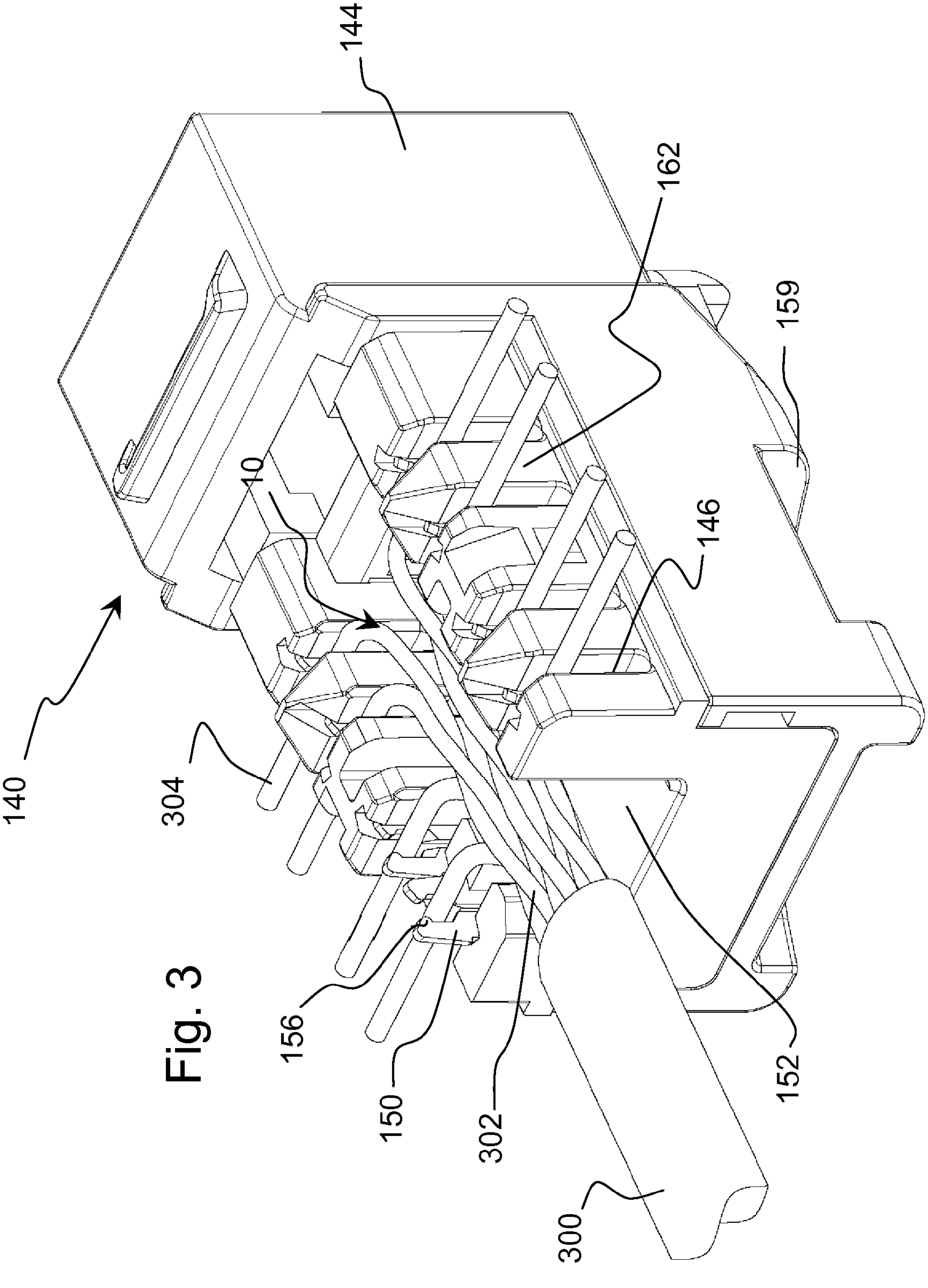
FIG. 3 is a perspective view of an RJ jack (90° RJ jack) with guide groove and detent for positioning and fixing the RJ jack to the RJ support portion of the wire termination tool.

As can best be seen in FIG. 2, the cutting module 100 is a replaceable cutting cartridge that comprises a cartridge body 102 with a forward end 104. The cutting module 100 includes wire insertion blades 106 that each have several (four) blade tines 108. Adjacent blade tines 108 are separated by a wire insertion blade slot 110. The sets of blade tines 108 are spaced apart such that each set of blade tines 108 terminates a wire of the corresponding IDC of the RJ jack generally designated 140. As can be seen in FIG. 3, the RJ jack has IDCs 150 in two rows spaced apart by a cable channel 152. The spacing provided by the cable channel 152 corresponds to the spacing between the sets of blade tines 108. The wire insertion blades 106 are adapted to press wires 302 into wire insertion blade receiving slots 126 of the cartridge body 102 and into the cutting/clamping slot of the associated IDC. The RJ jack 140 provides the RJ plug socket 144 with an RJ plug receiving direction which is 90° with respect to the direction of wire termination of wires in slots 146 for termination with IDC's 150.

The cutting module 100 includes cutting blades 112, with one of the cutting blades 112 being provided at the rear and the other of the cutting blades 112 being provided near the forward end 104. Each of the cutting blades 112 has a cutting blade slot 114. The cutting blades 112 are inserted into the forward cutting blade receiving slot 122 and the rear cutting blade receiving slot 124 respectively.

Each of the wire insertion blades 106 has a central wire insertion blade spring seat notch 120. An important aspect of the construction of the cutting module 100 is the provision of springs 116 that are disposed acting between the insertion blades 106 and a blade chamber cover 118 to bias the insertion blades 106 into a downward active position. With an active wiring engaging surface (lower surface) of each of the tines 108 being disposed about even with or slightly lower than the cutting edge 113 of the cutting blades 112, the wire insertion parts 106 press wires 302 into a seated (terminated) position in RJ jack termination locations (in the active cutting/clamping portion of each IDC 150) prior to the cutting blades 112 cutting the wires 302. The cartridge body 100 has a front cutting blade support wall 136 and a rear cutting blade support wall 138.

The cutting module 100 has guide slots 132 formed by upper guide surfaces 128 and lower guide surfaces 130. Each of the guide slots 132 receives a guide rail 90 as the cutting module 100 is moved from a removed position into a latched position.

The RJ jack (jack housing) 140 includes an IDC housing portion 142 and an RJ plug socket 144 (FIG. 3). The jack housing 140 supports plug contacts in the plug socket 144, as can be seen in FIGS. 11B, 12B, 13, 15 and 16. The plug contacts are connected to the IDCs 150. The IDC housing portion 142 has wire receiving slots 146 that provide access to the cutting clamping region of the respective insulation displacement contacts 150. Each IDC 150 has hooks 156 that retain the wire in a position ready for termination. This cooperates with the central cable receiving region 152 for a multi-wire cable 300. The wires 302 are held in the ready position above the cutting/clamping slot of a respective IDC 150 in an aligned position, with this facilitated by the hooks 156. With the jack housing 140 in a jack termination position, that is defined by the jack support portion 16, 16' and which establishes a plurality of wire termination locations, the wires 302 are engaged by each side of each tine 108 and moved to a final seated position with the wire terminated to a respective cutting/clamping slot of an IDC 150. A portion 304 of the wire 302 is cut off by the cutting blades 112.

Figure 11A:
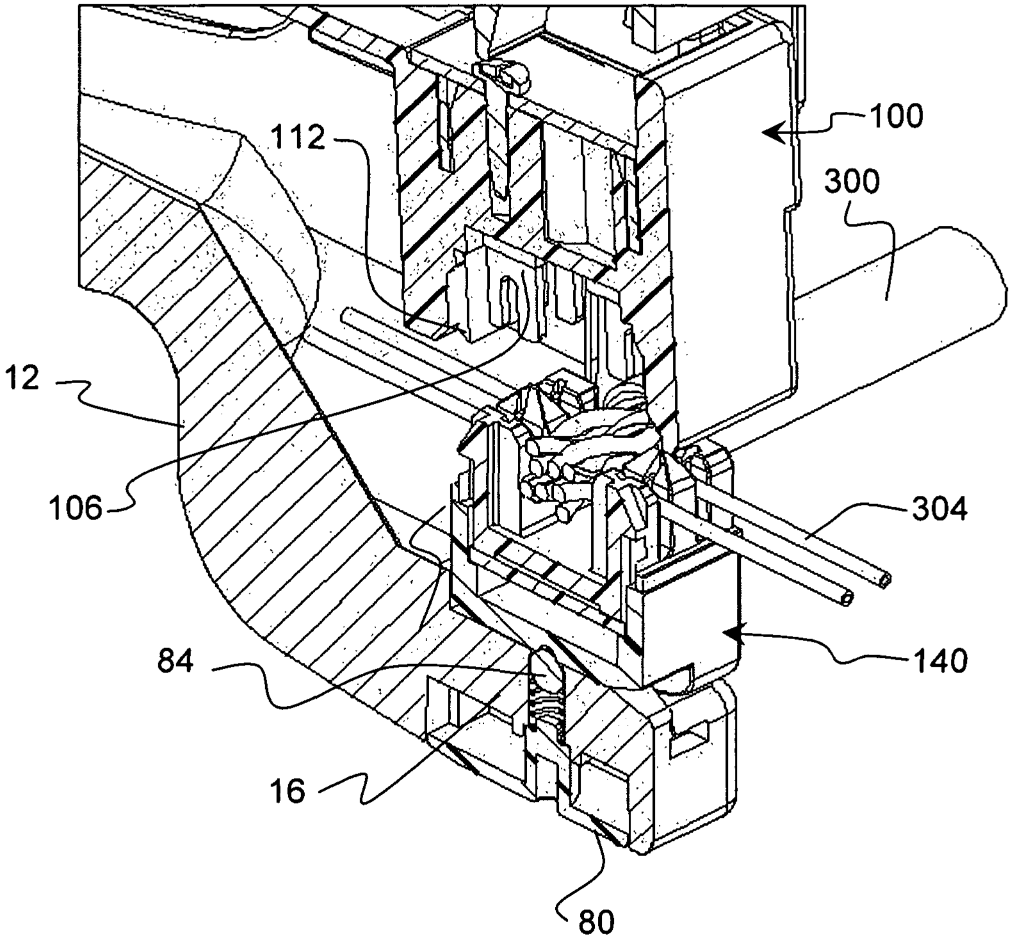
FIG. 11A is a cross-sectional cutaway view showing the wire termination tool in the region of the cutting module and supported RJ jack.
Figure 11B:
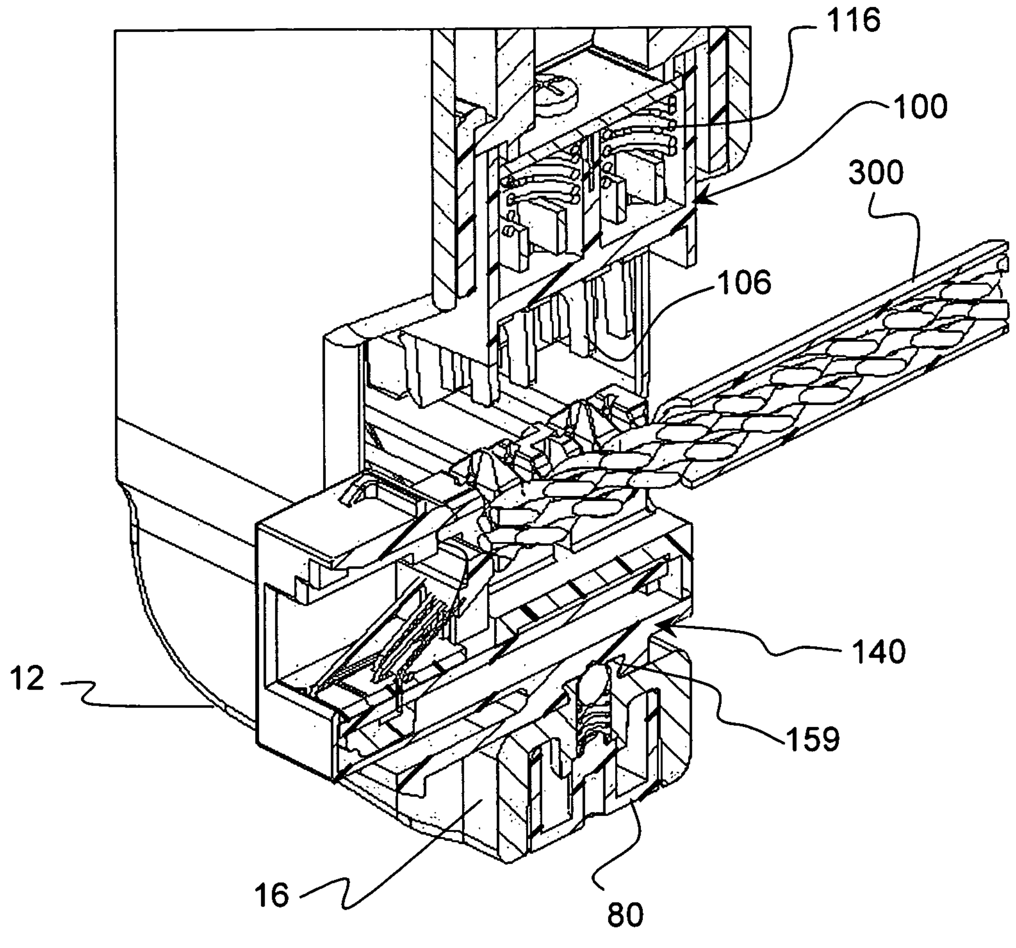
FIG. 11B is a cross-sectional cutaway view showing the wire termination tool in the region of the cutting module and supported RJ jack section with the view being taken 90° offset relative to the view of FIG. 11A.
Figure 12A:
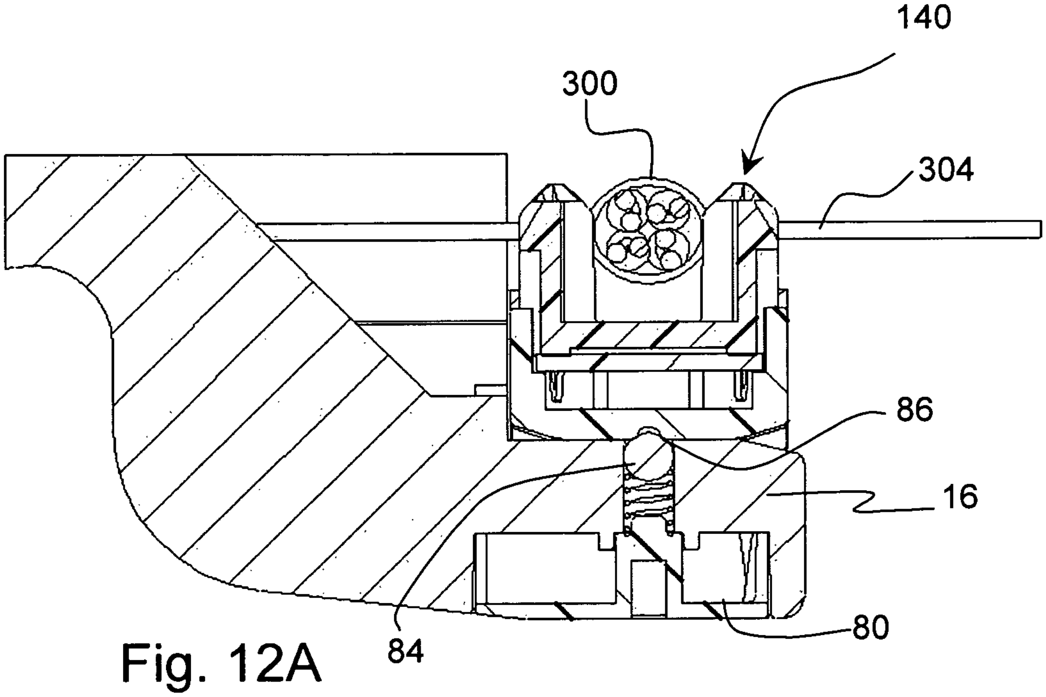
FIG. 12A is a cross-sectional cutaway view showing the wire termination tool and RJ jack in the region of the supported RJ jack.
Figure 12B:
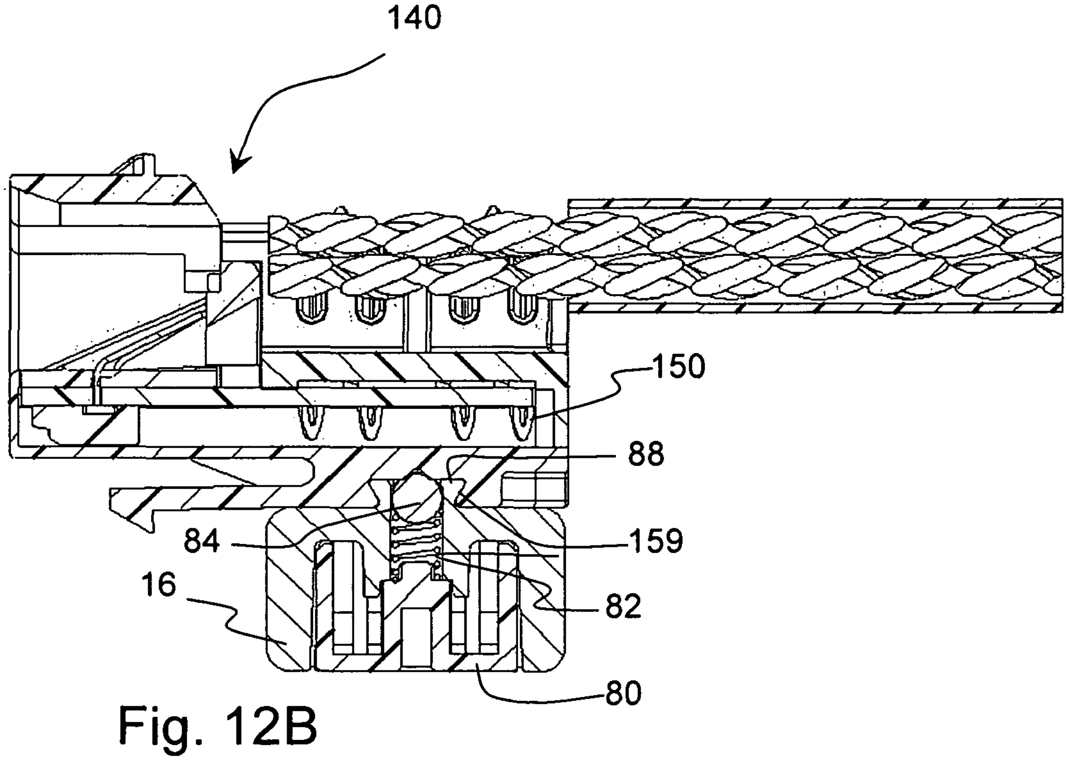
FIG. 12B is a cross-sectional cutaway view showing the wire termination tool and RJ jack in the region of the supported RJ jack section with the view being taken off set 90° relative to the view of FIG. 12A.
Figure 13:
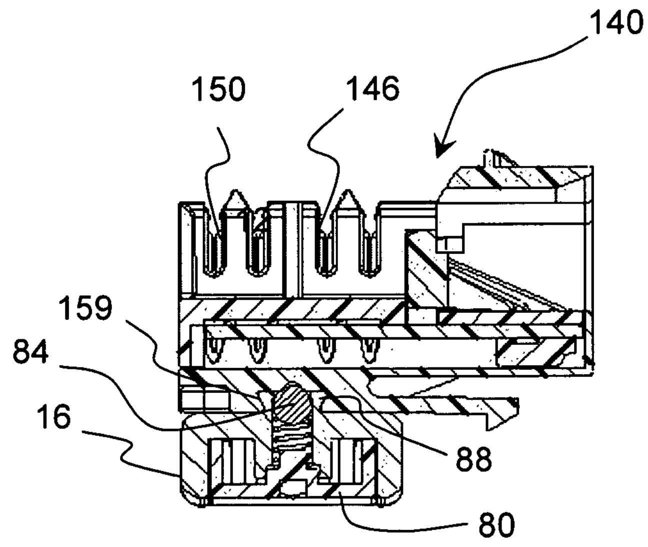
FIG. 13 is a sectional view showing in the RJ jack supported by the RJ portion of the wire termination tool with the section being taken through the middle of the RJ style jack.

As can be seen in FIGS. 12B, 11B, and 13, the RJ jack 140 has a dovetail receiving channel 159 so that it can be easily mounted on the guide rail 88 at the RJ support portion 16. This channel 159 is tapered at each side to provide a widened opening.

Figure 5:
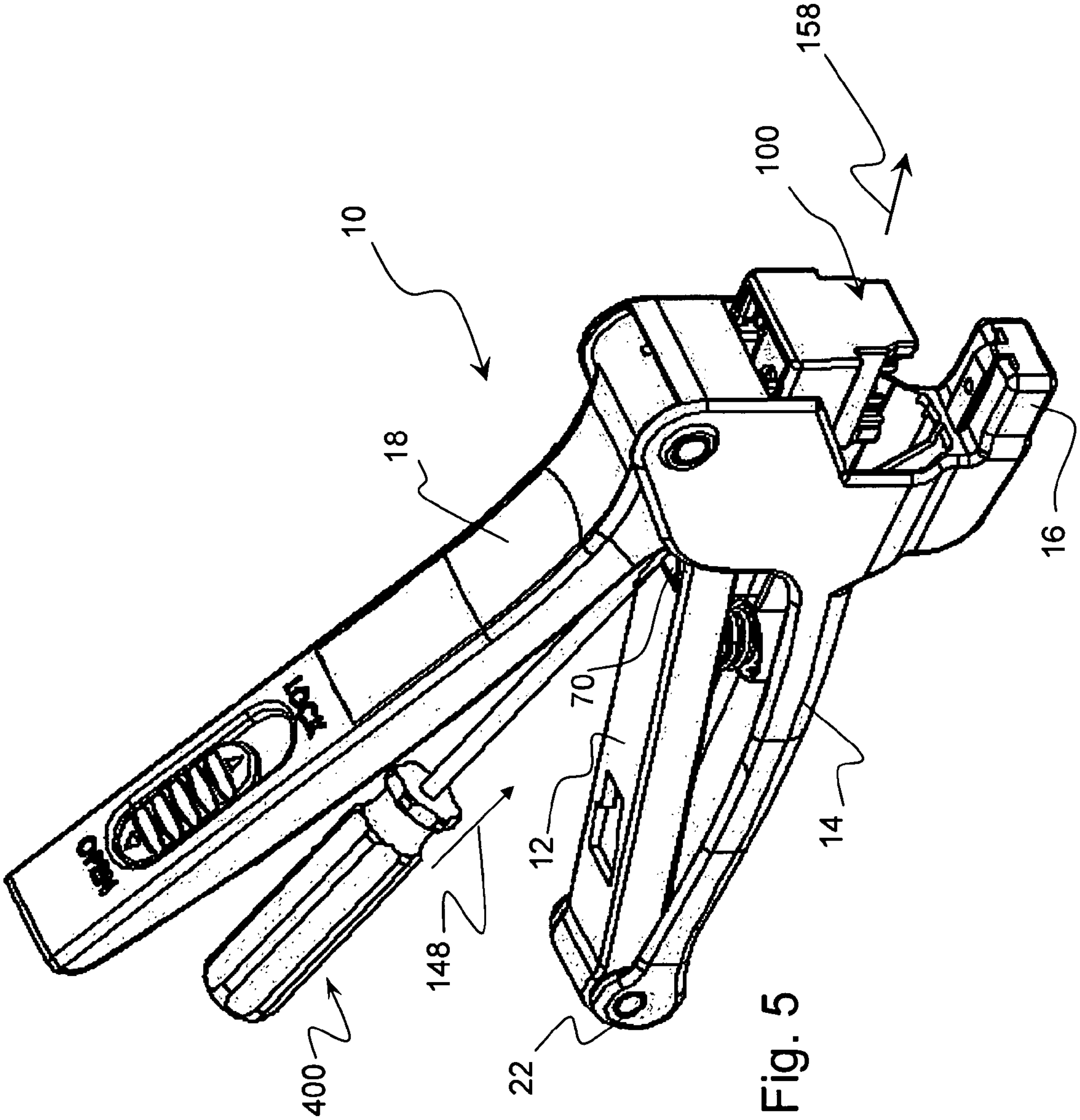
FIG. 5 is a perspective view showing the wire termination tool with screwdriver engaging a latching element to remove the cutting module.
Figure 6:
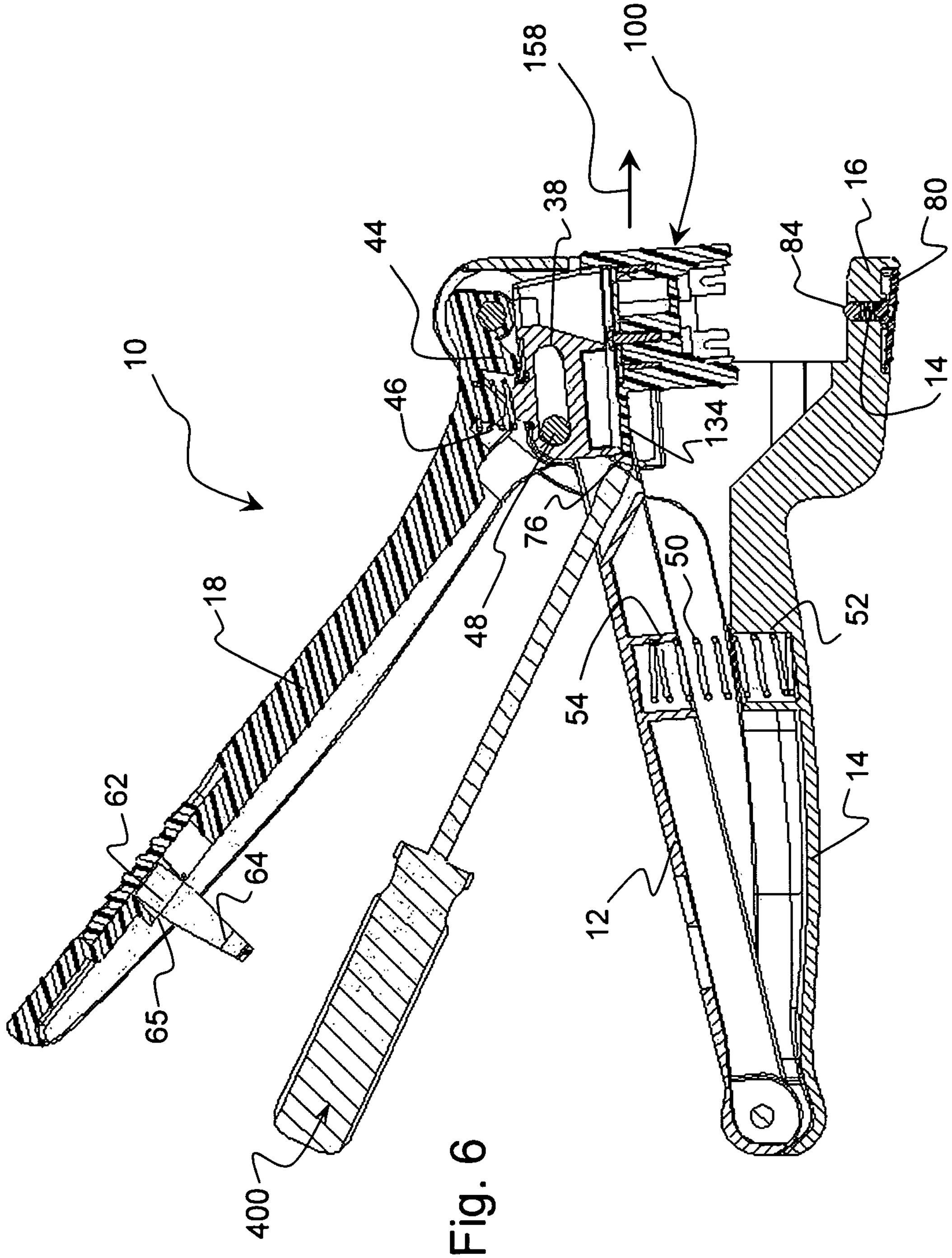
FIG. 6 is a cross-sectional view showing the wire termination tool with screwdriver engaging the latching element to remove the cutting module.

FIG. 4 shows the wire termination tool 10 with the cutting module 100 seated in a functioning latched position. FIG. 4 also shows a screw driver 400 which can be used to remove the cutting module 100, for replacement of the cutting module 100. This allows a replacement of the cutting module 100 with a different cutting module 100, for example for a different RJ jack 140 or to replace a damaged or worn out module 100. As shown in FIG. 5, an end of the screwdriver 400 is moved in the direction of arrow 148 and is inserted in the access opening 70 formed in the upper surface of the handle upper part 12. As can be seen in FIG. 6, this allows the end of the screwdriver 400 to engage latch element 134 and move latch element 134 so that it no longer engages a latching surface of part 12. The action of pressing the latch element 134 with the end of the screwdriver 400 moves the latch element 134 and also moves the cutting module 100 in the direction of arrow 158 for removal, as shown in FIGS. 5 and 6.

Figure 7A:
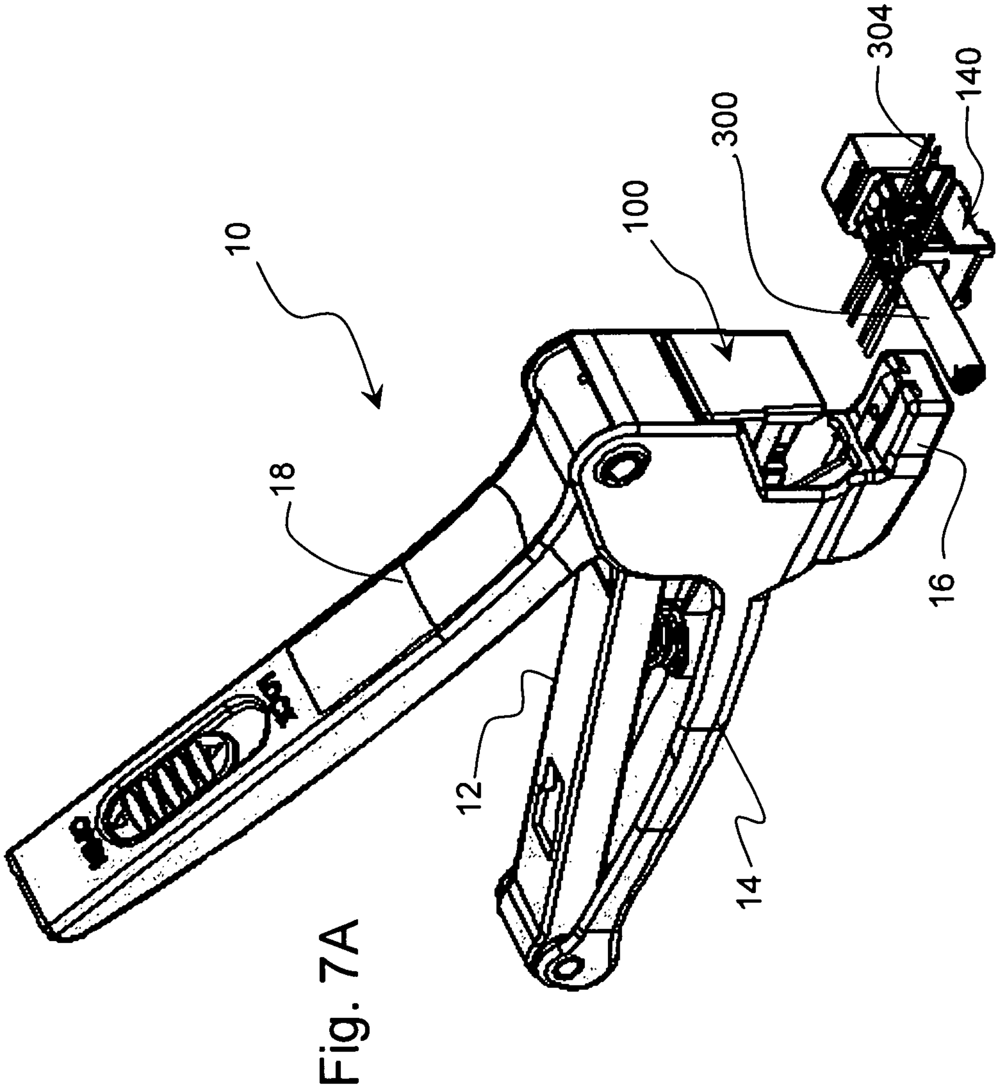
FIG. 7A is a perspective view showing the wire termination tool with RJ jack positioned to be mounted in a first direction.
Figure 7B:
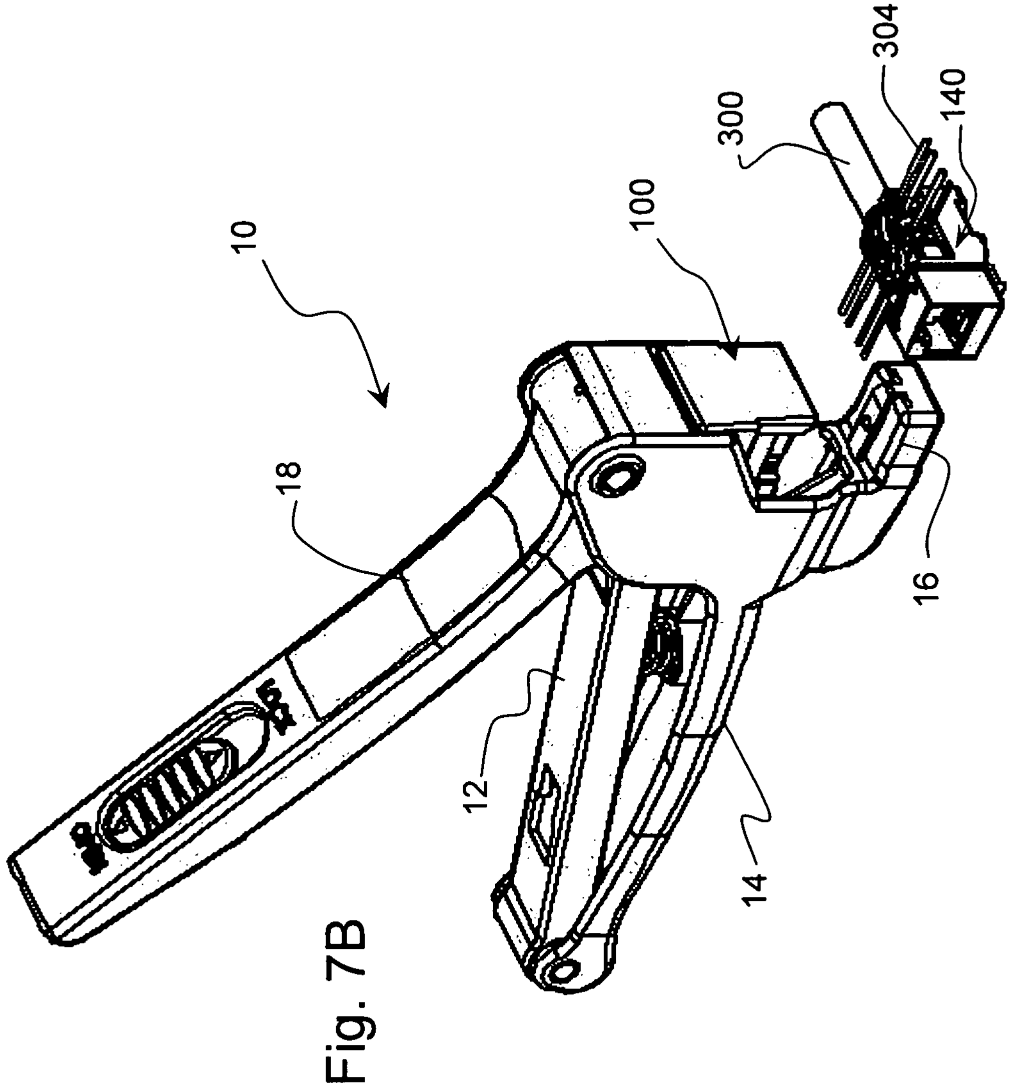
FIG. 7B is a perspective view showing the wire termination tool with RJ jack positioned to be mounted in a second direction.
Figure 8A:
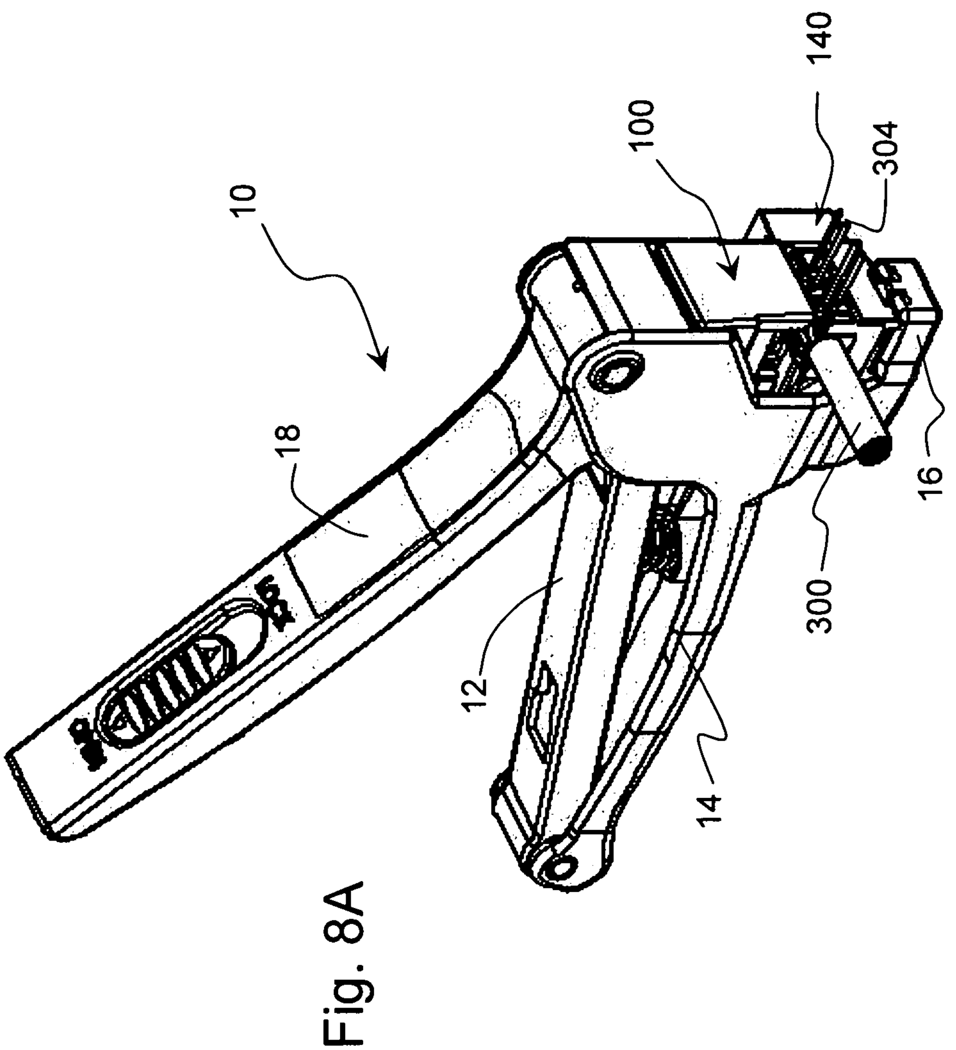
FIG. 8A is a perspective view showing the wire termination tool with RJ jack mounted in a first direction.
Figure 8B:
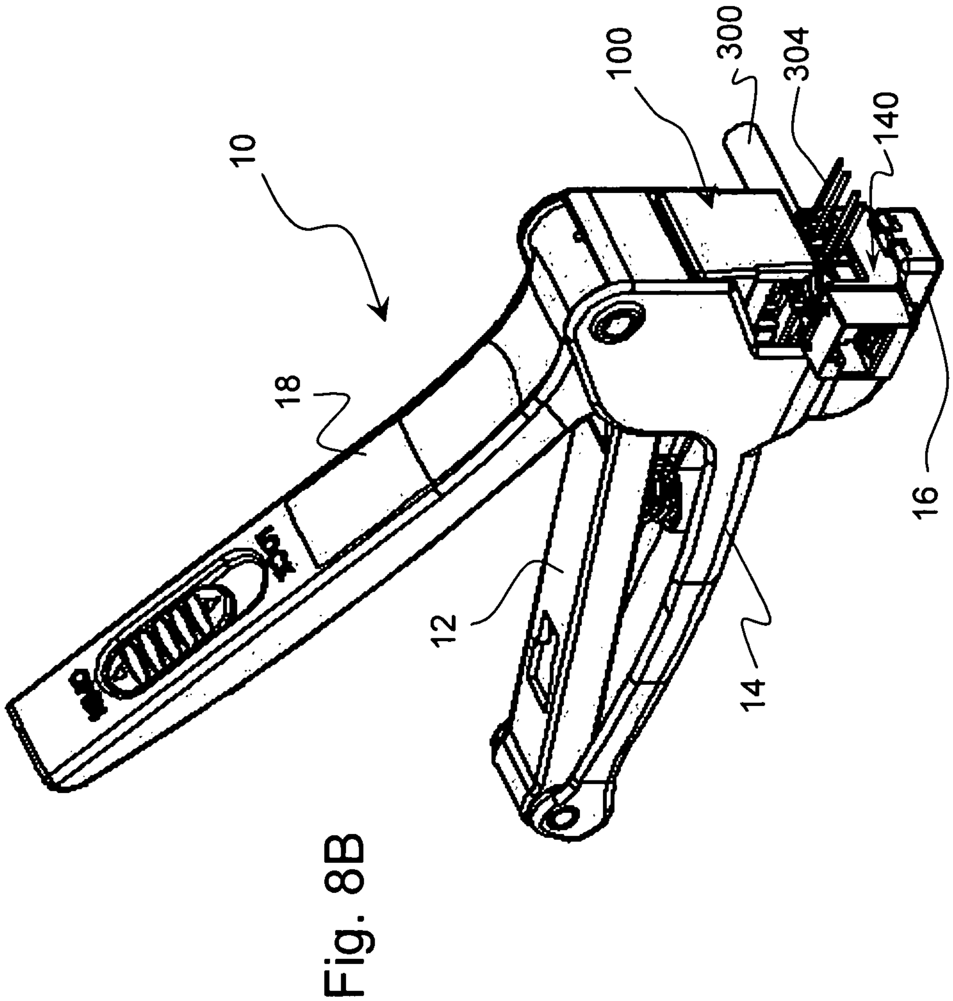
FIG. 8B is a perspective view showing the wire termination tool with RJ jack mounted in a second direction.

FIGS. 7A and 7B show the wire termination tool 10 in a position to receive an RJ jack 140 which is to have its wires 302 terminated with wire portions 304 to be cut off. FIG. 7A shows how the wire termination tool 10 can receive an RJ style jack 140 with cable 300 extending to the left in the drawing and with RJ jack portion at the right in the drawing. As shown in FIG. 7B, without modification, this same wire termination tool 10 can also receive an RJ jack 140 with cable 300 extending to the right and with RJ jack portion at the left in the drawing. FIGS. 8A and 8B show the same wire termination tool 10 with the RJ jack 140 guided into a fixed position by the guide rail 88 in each of the two orientations. In the positions shown in FIGS. 8A and 8B, ball 84 is engaged with a detent surface at the underside of the RJ jack 140. This is shown in cross-section in views 10A-12B. In the positions shown in FIGS. 9A and 9B, the handle lever part 18 has been moved relative to the handle lower pivot part 14. This has caused the handle 18 to apply force on the handle upper pivot part 12 with the cam pin 48 sliding in the cam slot 38 from a rear location in a forward direction whereby the handle upper pivot part 12 is caused to move toward the handle lower pivot part 14 against the spring force of springs 50. This terminates the wires by seating the respective wires 302 in cutting/clamping slots of each respective IDC 150. This occurs with the lower edge of the tines 108 pushing on the individual wires 302. As discussed above, the tines engage the respective wires 302 to seat (terminate) the wires in the cutting/clamping slot of each IDC 150 prior to the cutting blades 112 cutting off the wire ends 304.

Figure 9A:
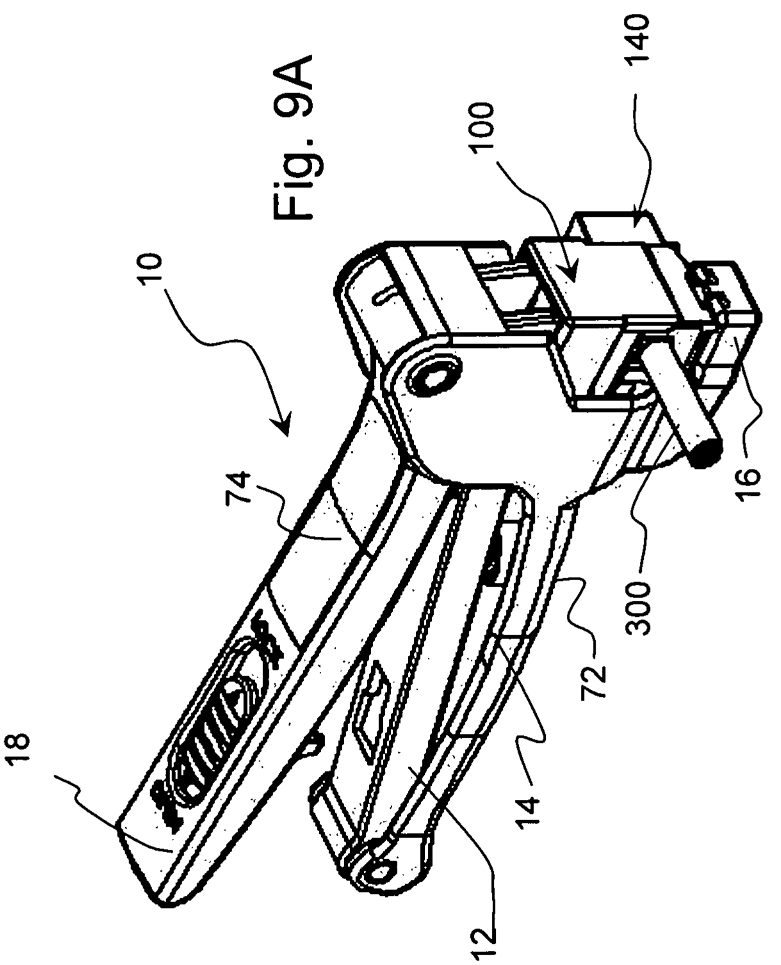
FIG. 9A is a perspective view showing the wire termination tool with RJ jack mounted in a first direction, and showing the cutting module in a fully engaged position, after seating the wires and just after cutting the wires.
Figure 9B:
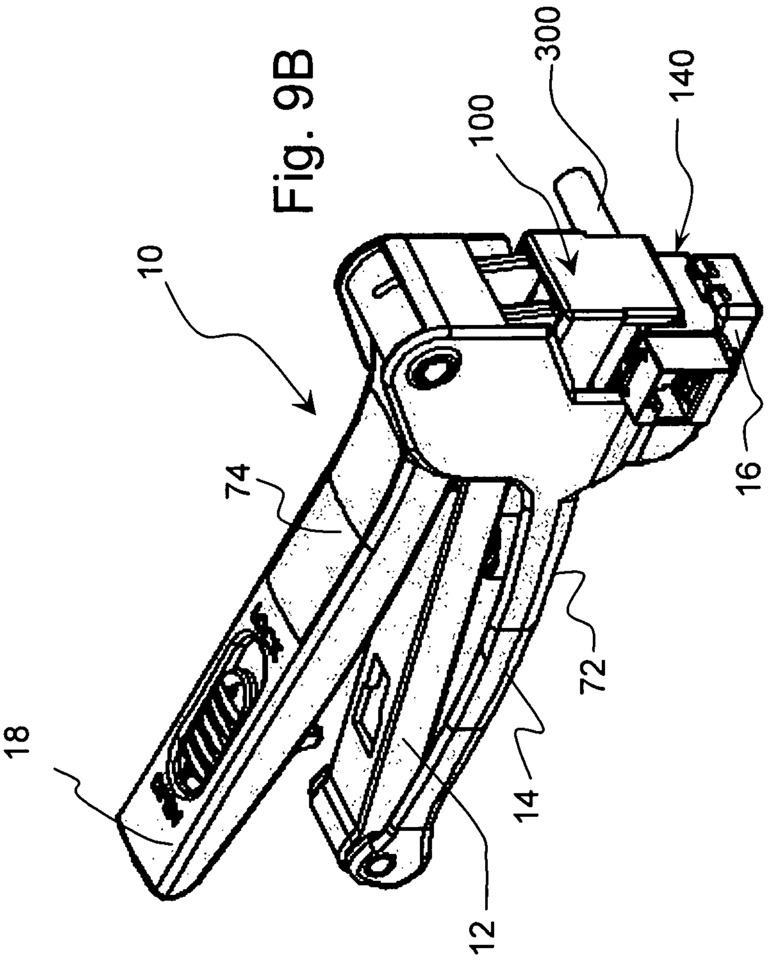
FIG. 9B is a perspective view showing the wire termination tool with RJ jack mounted in a second direction, and showing the cutting module in a fully engaged position, after seating the wires and just after cutting the wires.
Figure 10A:
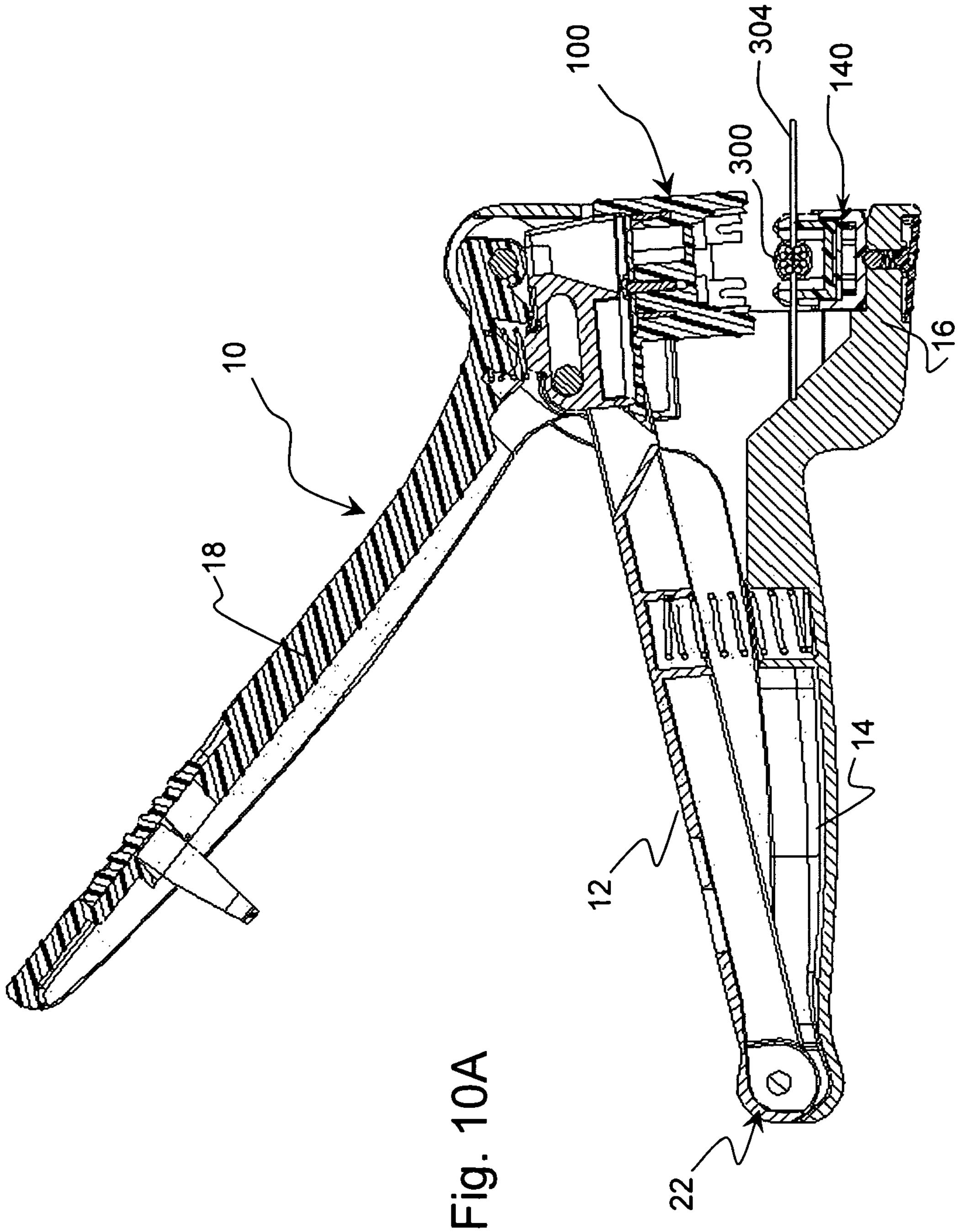
FIG. 10A is a cross-sectional view corresponding to the view of FIG. 8A.
Figure 10B:
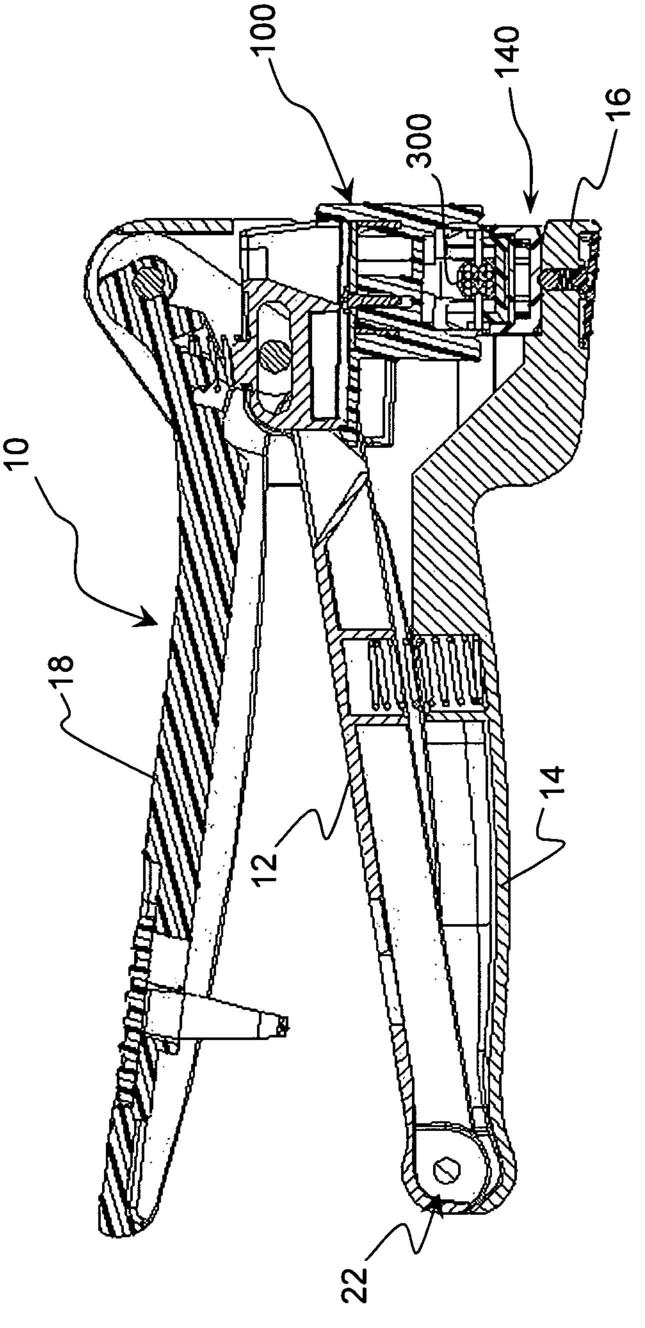
FIG. 10B is a cross-sectional view corresponding to the view of FIG. 9A.

FIG. 10A presents a view corresponding to FIG. 8A. FIG. 10B shows a view corresponding to FIG. 9A, showing the interaction between the cutting module 100 and the RJ jack 140, just after termination of the wires 302 and after cutting a portion 304 of the wires 302. FIGS. 10A and 10B further show the orientation of the cutting module 100 in positions along the curved course of movement of the cutting module 100, namely a circular path-based on the movement of handle upper pivot part 12 relative to the handle lower pivot part 14 about the pivot point 22. This provides a very even smooth and balanced transfer of force from the handle part 18 to the cutting module 100

FIGS. 11A, 11B show perspective views of the cutting module 100 and the RJ jack 140 just before termination of the wires 302. In FIG. 11B it can be seen that the spring mounting of the wire insertion blades 106, via springs 116 allows the wires to be engaged for seating the wires 302 in the cutting/clamping region of the respective IDCs 150 prior to these wires 302 being cut. The springs 116 also compensate for variations in the size of the wires, IDCs and blades 106.

FIGS. 12A and 12B shows the groove 159 of the IDC 140 with FIG. 12B showing the dovetail cross sectional shape. The groove 159 receives the rail 88 of the RJ support portion 16. The rail 88 also has a dovetail shape with this corresponding to a main central region of the groove 159. However, the groove 159 is tapered at each side to allow a smooth and simple alignment of the rail 88 in the groove 159, thereby facilitating a quick and simple connection. FIG. 13 shows a view similar to FIG. 12B, but with the RJ jack 140 in a position corresponding to FIG. 8A. Other types of RJ jacks can be made with this groove 159 to be used in the termination tool 10 with a corresponding cutting module 100. Also, an adapter can be mounted, via the ball 84, on the support portion 16 for holding other jacks or plugs with a corresponding seeding tool on the handle 12.

Figure 14:
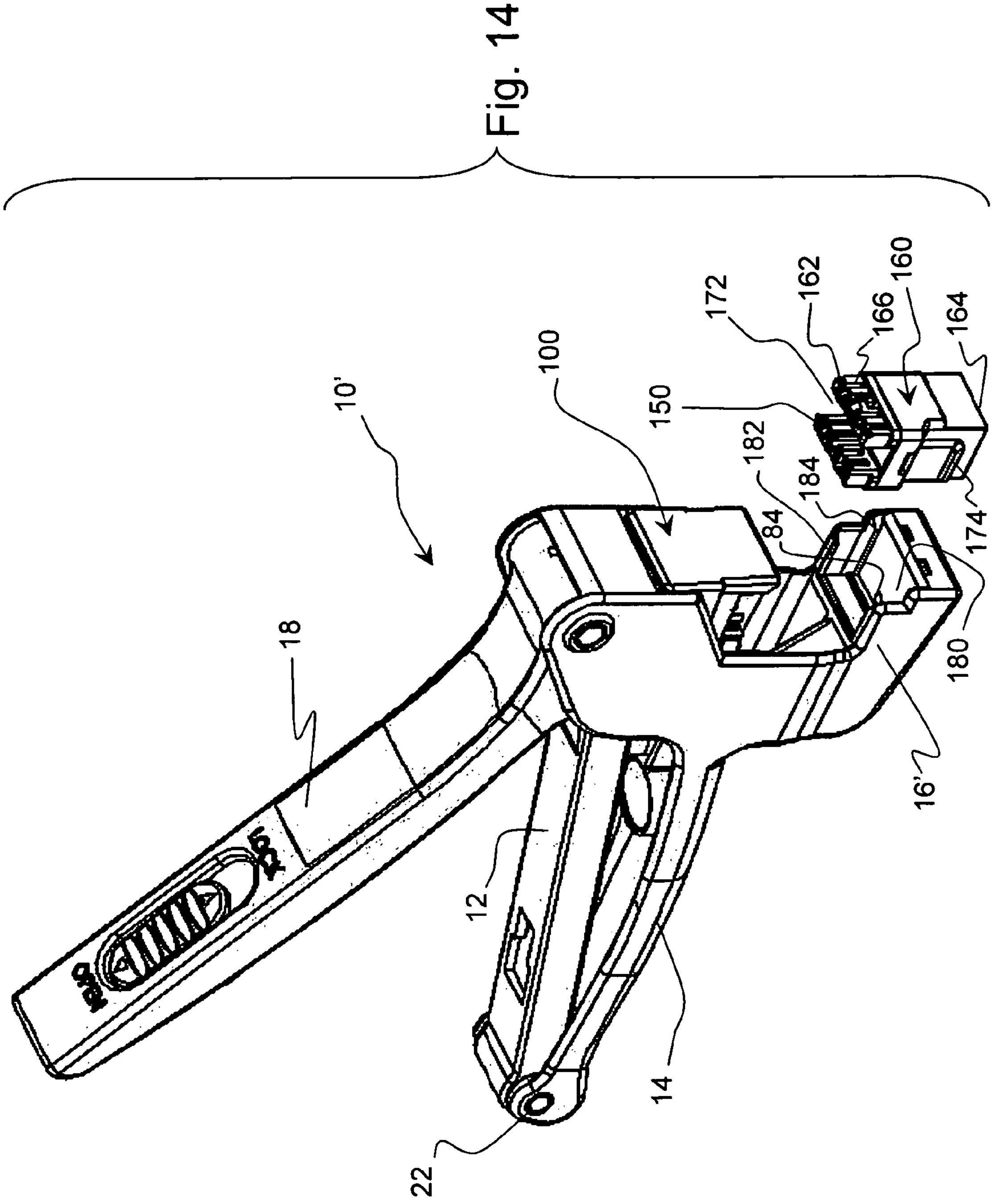
FIG. 14 is a cutaway perspective view showing a modified wire termination tool, particularly for a 180° RJ jack.

FIG. 14 shows an alternative embodiment according to the invention with a modified wire termination tool 10' that is provided for an RJ jack 160. The RJ jack 160 includes an IDC housing portion 162 along with an RJ plug socket 164. The IDC housing portion 162 provides termination slots or wire receiving slots 166 providing wire access to insulation displacement contacts (IDCs) 150. The IDCs 150 are provided in two rows with a central cable receiving region 172 in between. RJ jack 160 provides the RJ plug socket 164 with an RJ plug receiving direction which is 180° with respect to the direction of wire termination of wires in slots 166 for termination with IDCs 150.

The RJ jack 160 includes a latching element 174 which is used for engaging a housing such as a jack housing or a patch panel housing. As can best be seen in FIG. 16, a stop guide rail 176 is provided on the side opposite to the latching element 174.

The modified wire termination tool 10' is substantially identical to the wire termination tool 10 except that it has a modified jack support portion 16'. The wire termination tool 10' has a handle upper pivot guide 12 cooperating with a handle lower pivot guide 14 which are connected at a pivot point 22 in the same manner as described above with regard to wire termination tool 10. The handle lever part 18 is provided for activation. As with the wire termination tool 10, the modified wire termination tool 10' may be provided with an arrangement for transmitting the force from the actuating part 18 to the upper guide part 12 and lower guide part 14.

The jack support portion 16' has an RJ jack guide region 180 that provides a space for receiving a lower portion of the RJ jack 160. The jack support portion 16' has an upper guide rail 182 and a lower guide rail 184 that provide guide surfaces. The upper guide rail 182 extends along each side of the guide region 180 and engages the latching element 174 at one side of the RJ jack 160 and engages the stop guide rail 176 at the other side of the RJ jack 160. The lower guide rail 184 has an inwardly directed guide surface (directed toward the guide region 180) and engages the side surfaces of the RJ plug socket housing part 164. As can best be seen in FIG. 15, the jack support portion 16' has a spring mounted locking ball 84 seated in an interior region of jack support portion 16'. The arrangement is very similar to that of the wire termination tool 10 except that the locking ball contact region is the upper (preferably flat) surface of the jack support portion 16' in the guide region 180. The locking ball 84 is movable against this spring 82 as the RJ jack 160 is moved with the RJ plug socket housing part 164 sliding into the guide region 180. The housing part 164 has a socket back wall 186 which presses the ball 84 down as it passes over it with the spring 82 restoring the position of the ball 84 to provide a holding function against the socket back wall 186.

Figure 15:
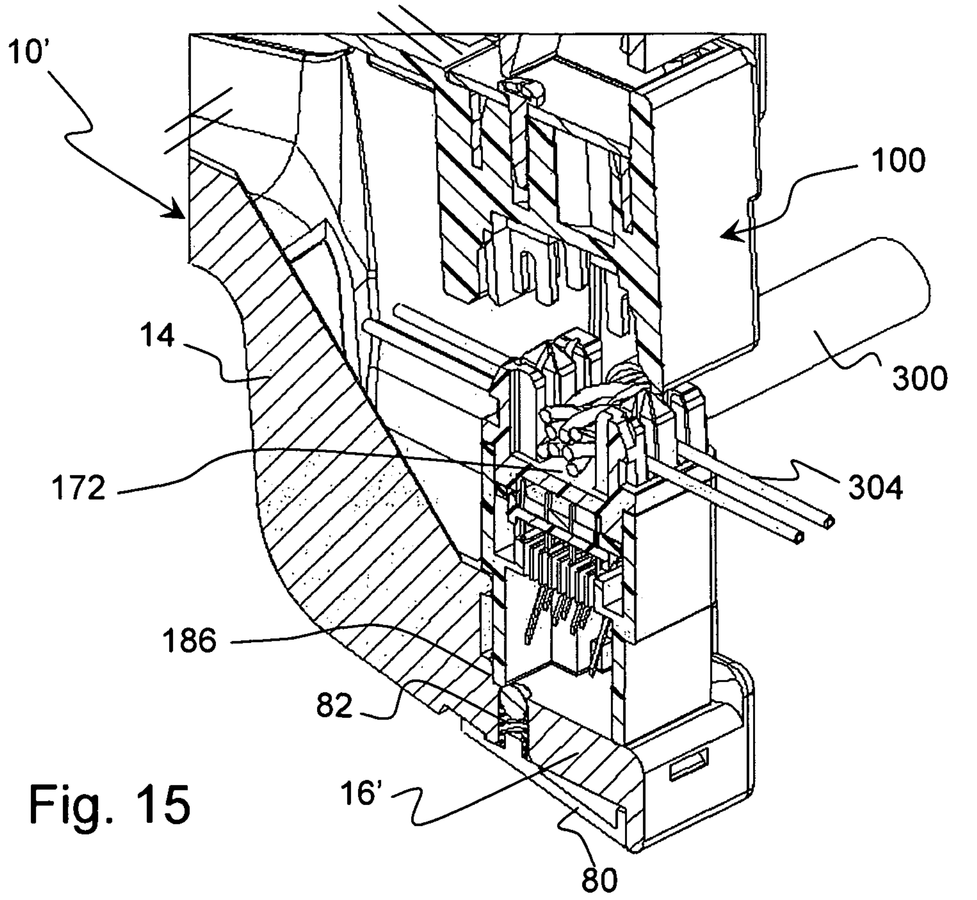
FIG. 15 is a cutaway sectional perspective view showing a modified wire termination tool and showing the 180° RJ jack in a seated position.
Figure 16:
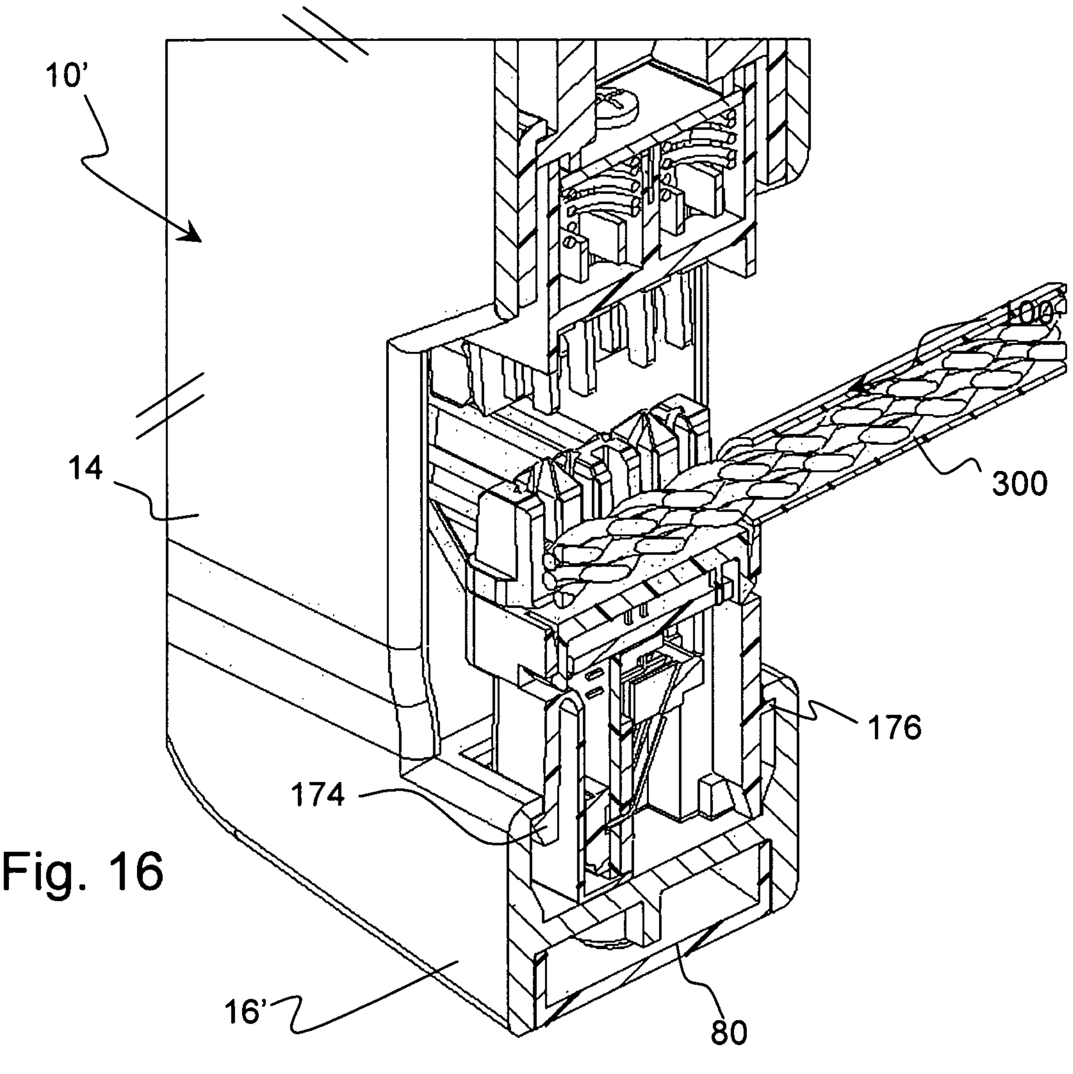
FIG. 16 is a cutaway sectional perspective view showing a modified wire termination tool and showing the 180° RJ jack in a seated position along a guide rail of jack support portion.

With the RJ jack 160 in a seated position shown in FIGS. 15 and 16, the wire termination tool 10' is used in the same manner as described above with regard to wire termination tool 10. The construction again allows the RJ jack 160 to be positioned in either of two positions for terminating the wires 302. This again allows flexibility with regard to the position of the cable 300 with respect to the RJ jack 160 and presents flexibility for the technician in terminating the wires 302.

While specific embodiments of the invention have been shown and described in detail to illustrate the application of the principles of the invention, it will be understood that the invention may be embodied otherwise without departing from such principles.

What is claimed is:

1. A wire termination and cutting tool comprising:
- a cutting module support portion;
- a cutting module removably connected to said cutting module support portion;
- a jack support portion connected to said cutting module support portion for relative movement of the cutting module support portion with respect to a pivot point;
- an actuator applying force to move said cutting module support portion with respect to said jack support portion in curved relative movement for cutting wires and inserting the wires into portions of a jack when the jack is mounted in a jack termination position on the jack support portion; and
- latching connection means for latching said cutting module to said cutting module support portion and for enabling the unlatching of said cutting module from said cutting module support portion for enabling removal of said cutting module from said cutting module support portion.

2. A wire termination and cutting tool according to claim 1, further wherein said cutting module includes cutting blades for cutting wires and also includes wire insertion parts, wherein the jack termination position is defined by said jack support portion, and the jack termination position establishes a plurality of wire cutting and insertion locations per jack.

3. A wire termination and cutting tool according to claim 2, wherein:
- said cutting module comprises a spring arrangement, and said wire insertion parts are biased by said spring arrangement in said cutting module, whereby said wire insertion parts press the wires into said a seated position at the wire cutting and insertion locations prior to said cutting blades cutting said wires.

4. A wire termination and cutting tool according to claim 3, in combination with the jack, the jack comprising:

a jack housing with a plug socket and an insulation displacement contact housing portion, the insulation displacement contact housing portion having a plurality of insulation displacement contacts, each insulation displacement contact being with a respective cutting and clamping slot, each insulation displacement contact having a respective wire retaining portion above the respective cutting and clamping slot, each wire retaining portion providing a wire position space, and corresponding to a position of a respective wire wherein said jack is disposed in said jack termination position, with the insulation displacement contacts at locations corresponding to the wire cutting and insertion locations.

5. A wire termination and cutting tool according to claim 2, wherein each of said cutting blades of said cutting module comprises a slot.

6. A wire termination and cutting tool according to claim 2, in combination with the jack, the jack comprising:

a jack housing with a plug socket and an insulation displacement contact housing portion, the insulation displacement contact housing portion having a plurality of insulation displacement contacts, each insulation displacement contact being with a respective cutting and clamping slot, each insulation displacement contact having a respective wire retaining portion above the respective cutting and clamping slot, each wire retaining portion defining a wire position space, and wherein said jack is disposed in said jack termination position, with the insulation displacement contacts at locations corresponding to the wire cutting and insertion locations.

7. A wire termination and cutting tool according to claim 1, the actuator further comprising a latching element that releasably engages a latching opening in the cutting module support portion to enable the actuator to be latched to the cutting module support portion to prevent movement of the actuator relative to the cutting module support portion when the latching element engages the latching opening.

8. A wire termination and cutting tool according to claim 1, further comprising:

a guide rail associated with and said cutting module support portion; and a guide groove associated with said cutting module, whereby said guide rail is guided in said guide groove to position said latching connection means in a position for latching said cutting module to said cutting module support portion.

9. A wire termination and cutting tool according to claim 1, wherein said cutting module support portion includes an access opening, and wherein said latching connection means, in a state wherein the cutting module is latched thereby to the cutting module support portion, is accessible through said access opening, whereby a screwdriver can unlatch the latching connection means to thereby enable the removal of said cutting module from said cutting module support portion.

10. A wire termination and cutting tool according to claim 1, wherein said jack support portion includes detent connection means cooperating with the jack for holding the jack in a position that is fixed relative to said jack support portion.

11. A wire termination and cutting tool according to claim 1, further comprising:

the jack, connected to said jack support portion, said jack including a plurality of wire termination locations each with an insulation displacement contact with a cutting and clamping slot; and jack detent connection means comprising a guide rail on said jack support portion for engaging a receiving groove of said jack and guiding said jack relative to said jack support portion into the jack termination position, the jack detent connection means further comprising a spring and a ball both mounted in said jack support portion, with said ball being biased by the spring toward a spring ball opening in a surface of said jack support portion and toward a detent in said jack, said spring-biased ball engaging said detent to hold said jack along said guide rail in said jack termination position.

12. A wire termination and cutting tool according to claim 11, wherein:

said receiving groove has a dove tail cross section; and said guide rail has a dove tail cross section.

13. A wire termination and cutting tool according to claim 1, wherein:

said cutting module support portion includes a cutting module pivot guide portion;

said jack support portion includes a jack pivot guide portion in the form of a pivot pin connected to said cutting module pivot guide portion for guiding said curved movement of said cutting module support portion relative to said jack support portion along a defined arcuate guide path;

said actuator is a lever acting on said cutting module support portion to move said cutting module support portion relative to said jack support portion along said defined arcuate guide path.

14. A wire termination and cutting tool comprising:

a cutting module support portion;

a jack support portion connected to said cutting module support portion for relative movement of the cutting module support portion relative to the jack support portion along a defined path;

an actuator applying force to move said cutting module support portion with respect to said jack support portion for cutting wires and inserting the wires into portions of a jack when the jack is mounted in a jack termination position on the jack support portion;

a cutting module;

a latching connection means for latching said cutting module to said cutting module support portion and for enabling the unlatching of said cutting module from said cutting module support portion for enabling removal of said cutting module from said cutting module support portion.

15. A wire termination and cutting tool according to claim 14, wherein the actuator further comprising a latching element that releasably engages a latching opening in the cutting module support portion to enable the actuator to be latched to the cutting module support portion to prevent movement of the actuator relative to the cutting module support portion when the latching element engages the latching opening.

16. A wire termination and cutting tool according to claim 14, further comprising:

a guide rail associated with said cutting module support portion; and a guide groove associated with said cutting module, whereby said guide rail is guided in said guide groove to position said latching connection means in a position for latching said cutting module to said cutting module support portion.

17. A wire termination and cutting tool according to claim 14, wherein said cutting module support portion includes an access opening, and wherein said latching connection means, in a position wherein the cutting module is latched thereby to the cutting module support portion, is accessible through said access opening, whereby a screwdriver can unlatch the latching connection means to thereby enable the removal of said cutting module from said cutting module support portion.

18. A wire termination and cutting tool according to claim 14, wherein said jack support portion includes detent connection means for holding fixed a position of the jack relative to said jack support portion, said detent connection means comprising a guide rail on said jack support portion for engaging a groove of the jack and guiding the jack into the jack termination position, the jack detent connection means further comprising a spring and ball both mounted to said jack support portion, with said ball being biased by the spring toward a spring ball opening in a surface of the jack support portion and toward the jack, said spring-biased ball engaging the jack to hold the jack in the jack termination position.

* * * * *